Nov. 11, 1958    J. M. PESTARINI    2,860,295
ELECTRIC POWER SYSTEMS

Filed June 15, 1954    2 Sheets-Sheet 1

INVENTOR
Joseph M. Pestarini
BY
Philip S. Hilbert
ATTORNEY

Nov. 11, 1958     J. M. PESTARINI     2,860,295
ELECTRIC POWER SYSTEMS

Filed June 15, 1954     2 Sheets-Sheet 2

INVENTOR
Joseph M. Pestarini
BY
Philip S. Hilbert
ATTORNEY

United States Patent Office 2,860,295
Patented Nov. 11, 1958

2,860,295

ELECTRIC POWER SYSTEMS

Joseph M. Pestarini, Minneapolis, Minn.; Alba M. Pestarini, executrix of said Joseph M. Pestarini, deceased Application June 15, 1954, Serial No. 436,773

3 Claims. (Cl. 318—154)

This invention relates to electric power systems.

In electric power systems it is desirable that the system be capable of operation in accordance with predetermined torque-speed relationships, particularly when the speed is variable. Furthermore, such systems are even more efficient when the torque-speed relationships may be varied at will without substantial changes in equipment.

Accordingly, it is an object of this invention to provide an electric power system of the character described wherein the torque-speed relationships may selectively take the following forms:

(1) The torque taking any value from zero to maximum within the operational limits of the machine, said torque having a direction coincident with or in opposition to, the direction of rotation of the machine and having small variations relative to a predetermined speed.

(2) The torque remaining substantially constant, for all speeds ranging between a maximum value in one direction and a maximum value in the other direction.

(3) The torque having a value which is inversely proportional to the speed; inversely proportional to the square of the speed; inversely proportional to the cube of the speed; or directly proportional to the speed.

(4) The torque is a linear combination of two or three functions of speed as set forth above.

(5) The torque varies between predetermined maximum and minimum values while the speed remains substantially constant and simultaneously, the average value of the torque is in accordance with any of the relationships set forth in paragraphs 2 to 4 above.

The electrical equipment constituting the power systems embodying the invention, is adapted to inherently provide the desired torque-speed relationships as indicated above, without the need for supplemental servo-mechanisms or other auxiliary equipment.

The invention herein is based on the utilization of direct current rotating dynamo electric machines known as metadynes, or machines having operational characteristics similar to those of metadynes, as described in a number of applicant's patents and discussed in applicant's publication Metadyne Statics, 1952, John Wiley and Sons, New York, N. Y.

Figure 1:
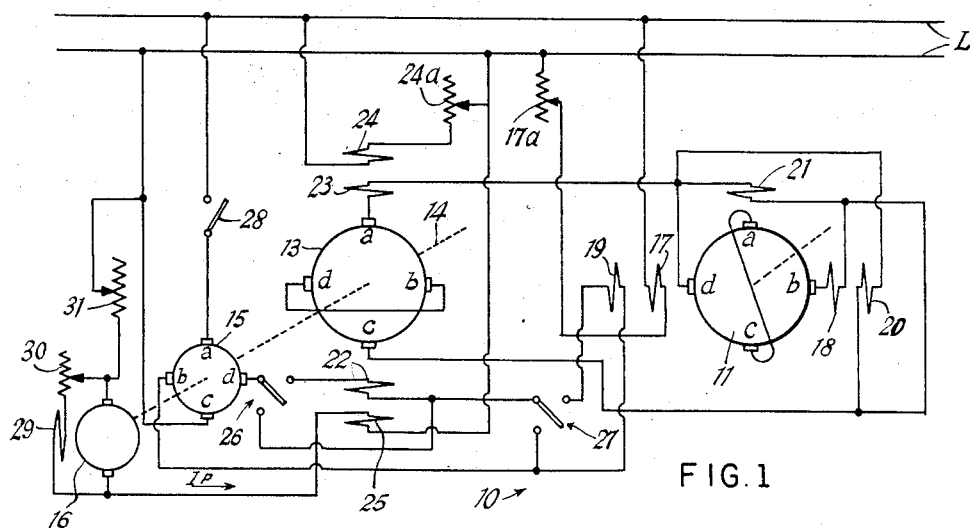
Figure 2:
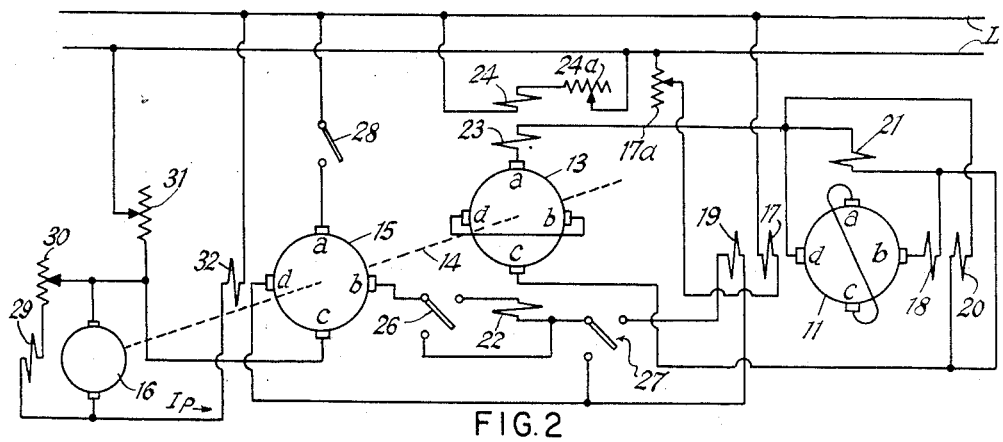
Figure 4:
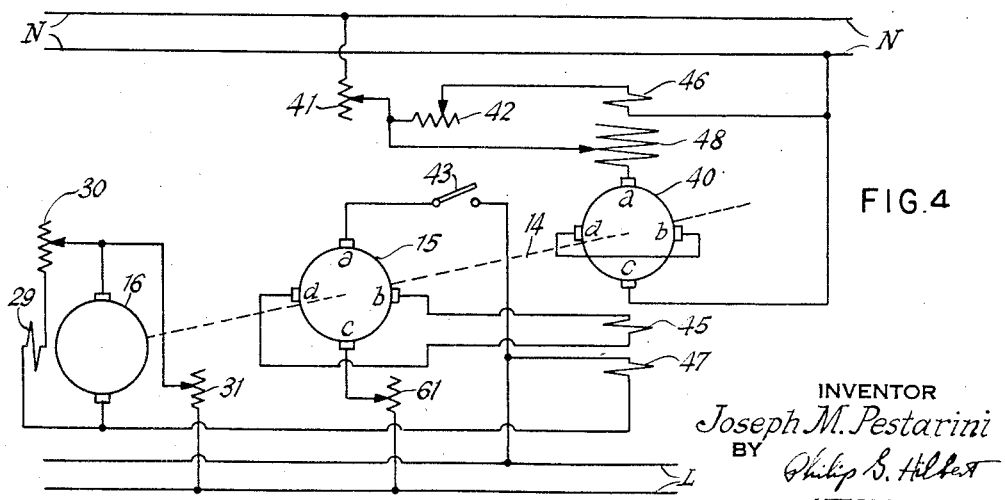
Figure 3:
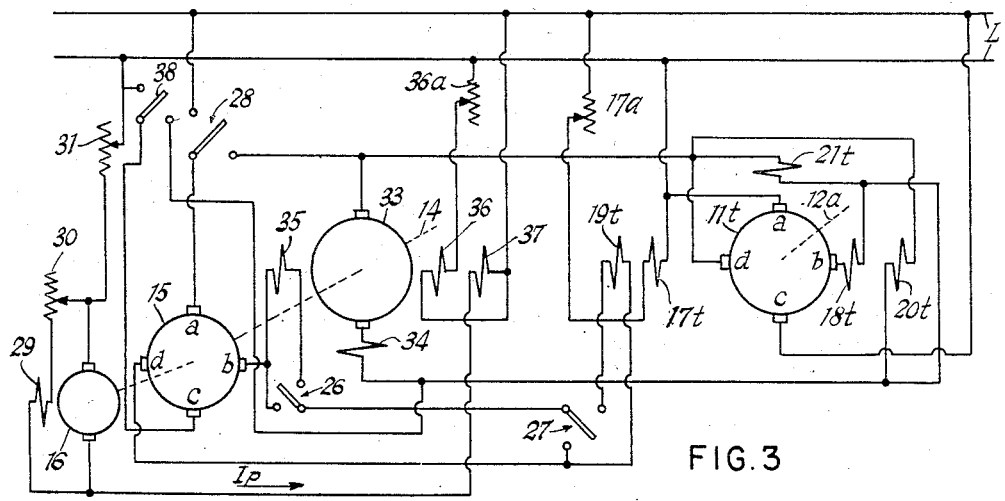
Figure 5:
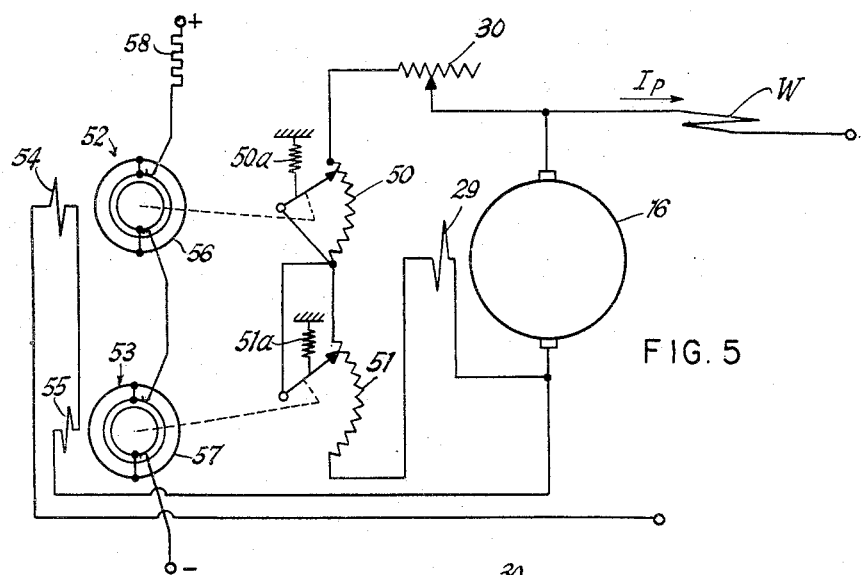
Figure 6:
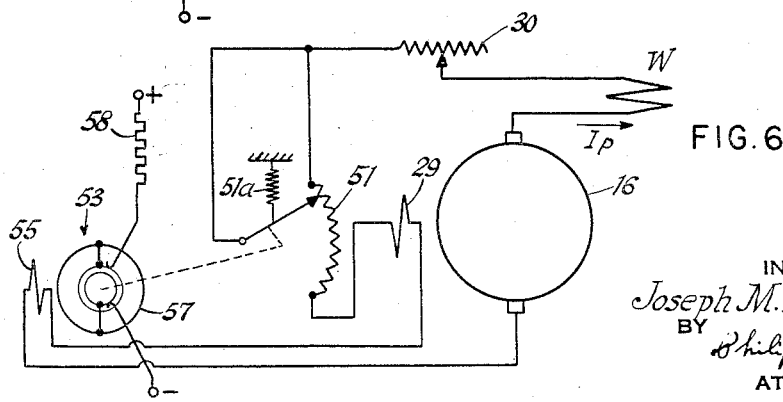

In the drawings; Fig. 1 is a diagrammatic showing of the components and connections of an electric power system embodying the invention and including two major units in the form of metadynes and two auxiliary units; Fig. 2 shows a variation in the arrangement of the auxiliary units of Fig. 1; Fig. 3 shows a system using two major units, one of which is a metadyne and the other a special dynamo; Fig. 4 shows a system using a single major unit in the form of a metadyne; Figs. 5 and 6 show alternative arrangements of the auxiliary portions of the system.

Referring in detail to the drawings and particularly to Fig. 1, 10 designates an electric power system embodying the invention. The system comprises essentially a constant voltage direct current line L; a metadyne generator 11 driven through its shaft 12 by suitable means, not shown; a variable speed metadyne motor 13 coupled by its shaft 14 to an exciter metadyne 15 and a regulator dynamo 16.

The generator metadyne11 comprises an armature and commutator having associated therewith a pair of short circuited primary brushes $a$, $c$ and a pair of secondary brushes $b$, $d$ connected to the primary brushes $a$, $c$ of the metadyne motor 13. The generator 11 further includes stator windings 17, 18, 19 and 20 whose magnetic axes coincide with the secondary commutating axis of the generator, and a stator winding 21 whose magnetic axis coincides with the primary commutating axis of said generator.

Winding 17 is energized from the constant voltage line L through a rheostat 17a. Winding 18, connected in the secondary brush circuit, functions as a hypocompensator inasmuch as it has turns less than the number necessary to provide exact compensation of the armature secondary ampere turns. Winding 19 is energized by the secondary output current of the metadyne exciter 15. The windings 20, 21 are shunt connected across the generator secondary brushes $b$, $d$.

The metadyne motor 13 includes primary brushes $a$, $c$ connected to the secondary brushes $b$, $d$ of the generator metadyne 11; short circuited secondary brushes $b$, $d$; and stator windings 22, 23, 24 and 25 whose magnetic axes coincide with the primary commutating axis of the motor.

Winding 22 is energized from the secondary brushes $b$, $d$ of the exciter metadyne 15 through selective operation of two way switches 26, 27. Winding 23, connected in the primary brush circuit, has a compensating function and may be operative to completely compensate the armature reaction or undercompensate the same by varying the effective turns of the winding through taps, not shown, and thereby vary the torque-speed characteristics of the system. Winding 24 is energized from the line L through a rheostat 24a and winding 25 is energized by the regulator dynamo 16.

The exciter metadyne 15 has no stator windings, its primary brushes $a$, $c$ being connected to the line L through a switch 28 and its secondary brushes may be selectively connected to stator windings 19, 22 through operation of switches 26, 27.

The regulator dynamo 16 is shunt excited by a winding 29 and the critical, building up speed of the dynamo is determined by the setting of the rheostat 30 in the excitation circuit. The dynamo is energized from the line L and is started through the rheostat 31. The induced voltage of dynamo 16 is in opposed relation to the voltage of the constant voltage network and a regulator current $I_p$ is the result of differences between the opposed voltages in either direction when the speed of the dynamo is higher or lower than said critical speed. In starting motor metadyne 13, the dynamo 16 may provide the initial torque through shaft 14, the motor thereafter adding its own torque to that of the dynamo.

In operating the system shown in Fig. 1, let it be assumed that the winding 18 functions to undercompensate the armature secondary ampere turns, that rheostats 17a, 24a are set to energize windings 17, 24 respectively with predetermined currents and that switches 26, 27 and 28 are open. When shaft 14 reaches a predetermined minimum speed $n_m$, the motor metadyne 13 develops sufficient torque to maintain said speed and rheostat 31 is operated to open the circuit.

Under these conditions, generator metadyne 11 supplies to motor metadyne 13 a constant current, which is maintained by suitable setting of the effective turns of stator windings 20, 21. Such a current creates a constant flux along the primary commutating axis of the generator if winding 23 is undercompensating in its effect. The value of the flux may be further controlled by suitable setting of rheostat 24a to vary the current input to winding 24.

If winding 23 is completely compensating in its effect, the flux is due only to the ampere turns of winding 24. The constant flux along the primary commutating axis induces an electromotive force between the secondary brushes b, d of the motor metadyne 13 which is proportional to the speed n, and hence, a flux with its axis coinciding with the secondary commutating axis, is created. Said last mentioned flux is proportional to speed n. Accordingly, motor metadyne 13 will develop a torque proportional to speed n.

Assume now that rheostat 31 is short circuited and rheostat 17a is set at a suitable value; that switches 26, 27, and 28 are open; that rheostat 24a has its full value in circuit; and that winding 23 is operative to either completely compensate or undercompensate the armature reaction. Under such conditions, the generator metadyne 11 will deliver a constant current and the output current $I_p$ of the regulator dynamo 16 will show large variations in either direction for very small changes in the speed n relative to the critical building up speed of said dynamo. Hence, the secondary current of motor metadyne 13 adjusts itself to maintain the speed n substantially constant at the critical speed of dynamo 16.

Thus, there is obtained a torque varying from zero to a maximum value within the limits of the machine, said torque having a direction coincident with the rotation of the machine or in opposition thereto, together with a constant speed equal to the critical speed of dynamo 16. As the value of said critical speed depends on the setting of rheostat 30, the characteristic constant speed with any positive or negative value of the torque within the limits of motor metadyne 13, will be obtained at an arbitrarily determined speed value, provided such speed is above the minimum speed $n_m$ for which the motor metadyne develops its own torque.

Assume now that shaft 14 is rotated by dynamo 16 and brought to its minimum working speed $n_m$. When said speed is attained, the resistance of rheostat 31 is disconnected from the circuit; rheostats 17a, 24a are similarly set, switch 28 is closed, switches 26, 27 are operated to connect only winding 19 to the output of metadyne exciter 15 and winding 23 is undercompensating in effect. Under these conditions, the secondary current supplied by said metadyne exciter will be inversely proportional to speed n and as such current energizes winding 19, the generator metadyne 11 will provide a current inversely proportional to said speed. Accordingly, the electromotive force induced between brushes b, d of the motor metadyne 13 will be constant and the torque developed by the motor will be inversely proportional to the speed at all speeds above speed $n_m$.

A constant torque will be developed for all workable speeds above $n_m$, if rheostats 24a, 31 are operated to open their circuits, rheostat 17 is set, switch 28 is closed, switches 26, 27 are operated to connect only winding 22 to the output of the exciter metadyne 15 and winding 23 completely compensates the armature reaction. Under these conditions, the generator 11 supplies constant current while the electromotive force induced between the secondary brushes of the motor metadyne 13 will be constant; hence the torque developed by shaft 14 will be constant at all speeds.

With metadyne 13 brought to the speed $n_m$, rheostats 17a, 24a and 31 are in open circuit, switch 28 is closed, windings 19, 22 are connected to the metadyne exciter 15 by suitable operation of switches 26, 27 and winding 23 completely compensates the armature reaction, then the current supplied by the generator 11 is inversely proportional to the speed n, the electromotive force induced between the secondary brushes of the motor metadyne 13 is constant and the torque developed by said motor is inversely proportional to speed n.

Thus, with the system of Fig. 1, using metadyne 15 as an exciter, the torque-speed relationships may take the following form: $T=Kn$; $T=Kn^0$; and $T=Kn^{-1}$, wherein T is the torque developed by the motor metadyne 13, K is a constant and $n^0=1$, hence, the torque may be proportional to the speed; constant or inversely proportional to the speed.

Such relationships are obtained upon the assumption that the iron is not saturated. It is apparent that by simultaneously utilizing two or three of the arrangements described, a torque-speed characteristic may be obtained which is a combination of those formulated above. Thus, by suitable settings of the rheostats, selection of the effective turns of winding 23 and suitable operation of switches 26, 27, a large number of torque-speed relationships may be obtained. On the other hand, if only the regulator dynamo 16 is used, a constant speed characteristic is obtained for all torque values.

In practical applications of the system set forth in Fig. 1, rheostat 30 is set to obtain a predetermined speed as a function of a variable such as time. Taking $f(t)$ as the function of such variable and a selected relationship such as $T=Kn^{-1}$, if the metadyne exciter 15 is connected to obtain such relationship, rheostat 31 is short circuited, dynamo 16 is brought into operation while rheostat 30 is continuously operated to obtain the relationship $n=f(t)$. Under these conditions, the torque will be related to the speed as $T=Kn^{-1}=K[f(t)]^{-1}$, only if the counter torque $T_c$ of shaft 14 is the same function of the speed, i. e. $T_c=Kn^{-1}$. This happens in many applications of the system and in such cases the current $I_p$ supplied by dynamo 16 is practically always zero.

In other applications of the system, where the counter torque $T_c$ may be irregular in value and show momentary departures from the relationship $T_c=Kn^{-1}$, the dynamo 16 is operative through its output current $I_p$ to temporarily increase or decrease the torque of motor metadyne 13 so as to keep its speed at the determined value despite irregularities in said counter torque. Thus, it appears that the system embodying the invention will provide the several torque-speed relationships described above for the mean value of the counter torque and therefore provides the relationship $n=f(t)$, despite changes in said counter torque.

In Fig. 2, the output current $I_p$ of the dynamo 16 is supplied to a stator winding 32 on the metadyne exciter 15, instead of the winding 25, as shown in Fig. 1. The same results are obtained with a reduction in the required power. The connections of the auxiliary and major units are otherwise the same, as shown in Fig. 1. In the event that increased precision of operation is desired in connection with the relationship $n=f(t)$, the regulator dynamo 16 may energize the stator winding 25 through an intermediary amplifier metadyne.

In Fig. 3, showing a modified form of the invention, a transformer metadyne 11t replaces the generator metadyne 11 of Fig. 1 and a dynamo 33 replaces motor metadyne 13. The metadyne 11t has its primary brushes a, c connected to the direct current constant voltage line L and its secondary brushes b, d connected to the brushes of dynamo 33. Metadyne 11t includes stator windings 17t, 18t, 19t and 20t with their magnetic axes coincident with the secondary commutating axis of said metadyne and a stator winding 21t with its magnetic axis coincident with the primary commutating axis of said metadyne.

Winding 17t is energized from line L through rheostat 17a; winding 18t undercompensates the armature secondary ampere turns; winding 19t is energized by the secondary output current of metadyne exciter 15; windings 20t, 21t are shunt connected across the metadyne secondary brushes b, d and are adapted to maintain the secondary current intensity proportional to the ampere turns of the secondary stator windings 17t, 19t independently of the actual voltage induced between the metadyne secondary brushes b, d.

Dynamo 33 is provided with a compensating winding 34 and exciting windings 35, 36, 37. Winding 35 may be energized by the output current of the metadyne exciter 15 through switch 26; winding 36 is energized by the line L through a rheostat 36a and winding 37 is energized by the output current of regulator dynamo 16 in circuit with line L and shunt excited by winding 29. Rheostat 31 is used for starting dynamo 16 and rheostat 30 regulates the critical building up speed of the dynamo.

The metadyne exciter 15 may have its primary brushes selectively connected to line L or to the brushes of dynamo 33 by suitable operation of switches 28, 38. The secondary output current of the exciter may be supplied to either of the windings 19t, 35 or both upon suitable operation of switches 26, 27.

Assume that rheostat 31 is short circuited, rheostats 17a, 36a are set at operating positions, and that switches 26, 27, 28 and 38 are open. Under these conditions, the transformer metadyne 11t will supply through its secondary brushes a constant current, the shaft 12a of said metadyne being coupled to a motor or regulator dynamo, not shown, in a manner known in the art.

Dynamo 33 will start by its own torque and its speed will increase until it attains the critical speed of the regulator dynamo 16, at which time dynamo 33 will have a substantially constant speed irrespective of the value or sign of the torque developed at shaft 14.

Assume now that rheostat 31 and switches 26, 27, 28 and 38 are open; that rheostats 17a, 36a are set at operating positions. Then, the transformer metadyne 11t will provide a constant current and the dynamo 33 will develop at shaft 14 a constant torque irrespective of the speed n of said shaft.

Assume further, that rheostats 17a, 31 are open; that rheostat 36a is set at an operating position and switches 26, 27, 28 and 38 are operated to connect only winding 19t to the secondary output of metadyne exciter 15 and to connect the primary brushes of the exciter to the line L. Under these conditions, the metadyne 11t will supply a current inversely proportional to the speed n while the exciting flux of the dynamo 33 is constant. Hence, shaft 14 will develop a torque inversely proportional to speed n.

As a further variation in operation, rheostats 31, 36a are open; rheostat 17a is set at an operating position, and switches 26, 27, 28, 38 are set to connect only winding 35 to the secondary output of exciter 15 and to connect the primary brushes of said exciter to line L. In such case, the metadyne 11t will supply a constant current while the exciting flux of dynamo 33 will be inversely proportional to speed n and the torque developed at shaft 14 will again be inversely proportional to speed n.

Assume now that rheostats 17a, 31 and 36a are open; that switches 26, 27, 28 and 38 are set to connect the primary brushes of exciter 15 to line L and to connect the output of said exciter to windings 19t and 35. Then, metadyne 11t will provide a current inversely proportional to speed n while the exciting flux of dynamo 33 will also be inversely proportional to said speed; hence the torque developed at shaft 14 will be inversely proportional to the speed $n^2$.

Finally, assume that rheostats 17a, 31 are open, rheostat 36a is set at an operating position, and switches 26, 27, 28, 38 are set to connect the primary brushes of the exciter 15 to the dynamo 33 and to connect the exciter output only to winding 19t. Under these conditions, with dynamo 33 constantly excited, there is produced a voltage proportional to the speed n, hence the exciter 15 provides a constant current output and metadyne 11t supplies to dynamo 33 a constant current. Accordingly, a constant torque is developed at shaft 14 irrespective of the speed.

In summary, the system shown in Fig. 3 is capable of providing the following torque-speed relationships:

(1) When regulator dynamo 16 is operating and exciter 15 is disconnected, a constant speed with a predetermined value is provided irrespective of the developed torque.

(2) When the exciter 15 is operating and dynamo 16 is disconnected, various torque-speed relationships are obtained including:

$$T=Kn^0, \quad T=Kn^{-1}, \quad T=Kn^{-2}$$

It is again noted that linear combinations of the foregoing relationships may be obtained as explained in connection with the system shown in Fig. 1.

When a predetermed speed independent of the developed torque, is desired, the regulator dynamo 16 is operated while the exciter 15 is disconnected, rheostat 30 being set at a predetermined operating position.

In those instances where it is desirable that the speed n shall vary with time, as when $n=f(t)$, such speed variation being independent of the developed torque, rheostat 30 is continuously varied in accordance with a predetermined pattern related to the time interval, as by means of a cam or the like.

In cases where the counter torque is continuously changing and where the torque-speed relationship may be any of those indicated previously at (2) above, or any linear combination thereof, the regulator dynamo 16 is disconnected from the system and the exciter metadyne 15 will operate alone.

When the speed n must change with the time t in accordance with a predetermined relationship as when $n=f(t)$, where the average value of the developed torque must comply with any of the relationships indicated at (2) above, or any linear combination thereof, while the instantaneous value of the counter torque changes and oscillates around its average value, both regulator dynamo 16 and exciter 15 will operate simultaneously and rheostat 30 will be continuously operated in a manner in make the critical speed $n_c$ of dynamo 16 equal at any instant to $f(t)$.

Then, if the counter torque of shaft 14 is exactly equal at any instant to a value determined by a selected torque-speed relationship, the current output $I_p$ of dynamo 16 will be zero. However, if the counter torque shows an instantaneous variation from said value, then the current $I_p$ will have a positive or negative value and the adjusted electromagnetic torque developed by dynamo 33 will be equal to the instantaneous counter torque with practically no change in the speed.

Some of the torque-speed relationships indicated at (2) above, are obtained while the current supplied by the metadyne generator 11 or the metadyne transformer 11t has a constant intensity. In the instant case, the constant current so supplied may be used to energize more than one motor metadyne 13 or dynamo 33, such motor metadynes or dynamos operating independently of each other.

It is understood that the metadyne generator 11 shown in Fig. 1 may be replaced by a metadyne transformer 11t as shown in Fig. 3, and similarly, the transformer 11t of Fig. 3 may be replaced by the generator 11. Furthermore, other types of metadynes having similar voltage-current relationships, may be used.

In Fig. 4 is shown a further modification of the invention, wherein the system comprises a main direct current constant voltage line N, an auxiliary constant voltage direct current line L, a metadyne motor 40 coupled to a metadyne exciter 15 and to a regulator dynamo 16 by a shaft 14 on which there is developed a counter torque.

The primary brushes a, c of the metadyne motor 40 are connected to the line N through a rheostat 41, while the secondary brushes b, d thereof are short circuited. The motor 40 includes stator windings 45, 46, 47, 48 whose magnetic axes coincide with the primary commutating axis of the motor. Winding 45 is energized by the output of exciter 15; winding 46 is energized from the line N through a rheostat 52; winding 47 is energized by the output of regulator dynamo 16 in circuit with line L; and winding 48, whose effective turns may be varied, is connected in the primary brush circuit of the motor for compensating the same.

The exciter 15 has its primary brushes $a$, $c$ connected to line L through a switch 43 and a starting rheostat 61, while its secondary brushes $b$, $d$ are connected to winding 45. Regulator dynamo 16 is shunt excited by winding 21 with a rheostat 30 in series therewith for setting the critical building up speed of the dynamo. The dynamo 16 is connected to line L through a rheostat 31 and winding 47. Dynamo 16 may be used to start the operation of the system, the motor metadyne 40 then developing its own torque and the rheostat 41 being then short circuited.

Assume that the rheostat 31 is short circuited, rheostat 42 and switch 43 being open. Under these conditions the motor 40 will develop any torque within the limits of its capacity at constant speed equal to the critical speed of regulator dynamo 16, as determined by the setting of rheostat 30.

Assume further, that after starting, rheostat 31 is open, switch 43 is open, rheostat 42 is set at an operating position and winding 48 is set to undercompensate the armature reaction. Under these conditions, the current traversing the primary brushes of motor 40 is substantially constant while the flux created by the secondary current thereof is inversely proportional to the speed $n$. Hence, the developed torque is inversely proportional to said speed $n$.

Assume now that rheostat 31 is open, rheostat 41 is short circuited, switch 43 is closed, rheostat 61 is short circuited, rheostat 42 is open and that winding 48 again undercompensates the armature reaction. Then, the current traversing the primary brushes of motor metadyne 40 is inversely proportional to the speed $n$ and the flux created by the secondary brushes thereof is also inversely proportional to said speed. Hence, the torque will be inversely proportional to the square of speed $n$.

Thus, the system set forth in Fig. 4 may result in the rotation of shaft 14 at a predetermined constant speed regardless of the counter torque, with the regulator dynamo 16 operating and the exciter 15 inoperative; because under the indicated conditions, the motor 40 will develope the torque necessary to meet the counter torque, the variations in motor speed with respect to the no-torque speed, being negligible. The load or counter torque is not varied. However, the motor torque is automatically modified by the action of the regulator dynamo 16 so as to equal the load torque, the required speed variation being negligible. Furthermore, the system may provide a torque inversely proportional to the speed $n$, with both regulator dynamo and exciter operating; or a torque inversely proportional to the square of speed $n$, with the regulator dynamo inoperative and exciter operating.

In the last two cases, the torque T equals $Kn^{-1}$ and $Kn^{-2}$, respectively. It is understood that any linear combination of the two relationships may be obtained.

In considering the operation of the regulator dynamo 16 and exciter metadyne 15, it will be seen that there may be provided a predetermined speed-torque relationship as indicated above, or any linear combination thereof, and further, so operate the system that the mean value of the developed torque corresponding to the speed $n$ shall satisfy the selected relationship.

Furthermore, the selected speed may be kept constant even if the counter torque shows variations from the value corresponding to the selected relationship. In this case, the developed torque must oscillate about said mean value and show the same variations while the speed remains constant. Accordingly, the regulator dynamo and the exciter metadyne have a cooperative action and the selected torque-speed relationship for the average value of the torque is determined by continuous modification of the rheostat 30 to provide operating positions thereof in accordance with a predetermined pattern.

The systems shown in Fig. 1, may also include a direct current constant voltage auxiliary source for energizing the regulator dynamo 16 and metadyne exciter 15 thereof, in the manner shown in connection with Fig. 4.

It may be further provided that in systems of the instant invention, the supplement of the developed torque on either side of its predetermined mean value while speed $n$ is kept constant, be limited to a predetermined value. If said last mentioned value is reached in operation, speed $n$ is changed accordingly.

This may be attained by essentially allowing the output current $I_p$ of the regulator dynamo 16 to reach a maximum value on either side of the critical speed of said dynamo, after which said critical speed is modified accordingly by varying the resistance of the excitation circuit of the dynamo. The current $I_p$ may be used to vary the resistance of said excitation circuit.

Thus, as shown in Fig. 5, the regulator dynamo 16 with its shunt exciting winding 29 and rheostat 30, is further provided with a pair of complementary rheostats 50, 51 in series with rheostat 30. As indicated in the figure, one of said pair of rheostats is short circuited and the other rheostat is fully in circuit, providing the speed $n$ remains constant independently of instantaneous variations in torque relative to its predetermined mean value corresponding to said speed. The movable arms of rheostats 50, 51 are retained in normal position by springs 50a, 51a, respectively.

Means responsive to changes in the current $I_p$ is provided to actuate the arms of rheostats 50, 51, in the form of rotatable relays 52, 53. The relays comprise series connected fixed windings 54, 55 in circuit with the output of dynamo 16 and therefore traversed by current $I_p$, and rotatable windings 56, 57 series connected and energized with a substantially constant current derived from a constant voltage source and a ballast resistor 58.

With current $I_p$ remaining below the maximum value indicated above, the rotatable windings of the relays 52, 53 coupled to the arms of rheostats 50, 51 respectively, cannot develop a torque sufficient to overcome the resistance of springs 50a, 51a thereby leaving speed $n$ constant.

When current $I_p$ exceeds said maximum value on either side of the critical speed of the dynamo, the developed torque of the rotatable winding of the corresponding relay will overcome the action of the corresponding spring and thus allow the excitation of the dynamo to be varied to change the speed $n$ of the dynamo in the desired direction. The output of dynamo 16 is connected as indicated in Figs. 1–4, to the stator winding of a motor or generator.

In Fig. 6, the regulator dynamo 16 is shown as series excited by winding 29, the dynamo not being energized from a direct current source. In this case, the output current $I_p$ is unidirectional and accordingly, a single rotatable relay 53 controls the operation of a single rheostat 51 connected in series with rheostat 30 and excitation winding 29.

The regulator dynamo which provides the control current $I_p$ is described in greater detail in Patents 1,962,030 and 2,055,240.

The generator metadyne 11, shown in Fig. 1, is of the S type, more specifically described in applicant's Patent 2,112,604 and British Patent 420,167. The transformer metadyne 11t, shown in Fig. 3, is of the cross type, more specifically described in applicant's Patent 2,637,013. The motor metadynes 13, 40 are the gamma type, more specifically described in applicant's Patent 2,662,999. In place of motor metadynes 13, 40, there may be used motor metadynes of the theta type, more fully described in applicant's Patent 2,642,556, such motor metadynes being distinguished by the omission of primary compensating windings.

It is understood that the interconnections of the metadyne exciter 15 and regulator dynamo 16, as shown in Fig. 2, may also be used in the systems of Figs. 1, 3 and 4.

The motor metadynes 13, 40 have been brought to their minimum operational speed by means of the regulator dynamo 16, as described above. Alternatively, these metadynes may be started directly by providing the same with an additional stator winding whose magnetic axis coincides with the secondary commutating axis of the metadyne and energizing said winding with the primary current of the metadyne or by means of the constant voltage line.

By way of example, the system of the invention disclosed herein may be applied to the driving mechanism of automatic tool machines, such as lathes or milling machines wherein the tool is actuated by means of a template or in response to recorded signal patterns; such tool requiring variations in driving speed and torque yet having predetermined relationships between said speed and torque.

Having thus disclosed my invention, I claim as new and desire to protect by Letters Patent:

1. An electric power system comprising a main direct current source, an auxiliary constant voltage direct current source, a dynamo electric machine comprising at least two stator windings, circuit means connecting said main current source and said dynamo electric machine, a metadyne exciter and a regulator dynamo operating at its critical building up speed, means coupling said exciter and regulator dynamo to said dynamo electric machine, said exciter including a first pair of brushes adapted to be connected to said auxiliary current source and a second pair of brushes adapted to be connected to one of the stator windings of said dynamo electric machine, circuit means connecting the output of said regulator dynamo to one of the stator windings of said dynamo electric machine, and switch means for selectively making circuit connections between said regulator dynamo, exciter, dynamo electric machine and said auxiliary current source whereby said dynamo electric machine is adapted to selectively provide torque-speed relationships including (1) a substantially constant speed independent of the developed torque, (2) a torque inversely proportional to the rotational speed, (3) a predetermined speed-mean torque value characteristic, the speed varying in accordance with a predetermined relationship, with an instantaneous counter torque oscillating about said mean value corresponding to said speed-mean torque value, the corresponding speed being kept substantially equal to the value corresponding to said predetermined relationship.

2. An electric power system comprising a constant voltage direct current source, a metadyne having a constant current output, said metadyne including a plurality of control stator windings, a dynamo electric machine comprising at least two stator windings, circuit means connecting the output of said metadyne and the input of said dynamo electric machine, a metadyne exciter and a regulator dynamo operating at its critical building up speed coupled to said dynamo electric machine, said exciter including a pair of primary brushes connected to said direct current source, and a pair of secondary brushes, switch means for making selective connections between said secondary brushes, one of the control windings of said dynamo electric machine and one of the control windings of said metadyne, and circuit means for connecting the output of said regulator dynamo with another of the control windings of said dynamo electric machine.

3. An electric power system as in claim 1 wherein said main current source comprises a generator metadyne having a pair of short circuited primary brushes and a pair of secondary brushes in circuit with the input of said dynamo electric machine.

References Cited in the file of this patent

UNITED STATES PATENTS

| | | |
|---|---|---|
| 1,945,447 | Pestarini | Jan. 30, 1934 |
| 2,605,452 | Hey et al. | July 29, 1952 |
| 2,636,996 | Buess | Apr. 28, 1953 |
| 2,642,556 | Pestarini | June 16, 1953 |